United States Patent [19]
Yamaguchi et al.

[11] Patent Number: 4,746,697
[45] Date of Patent: May 24, 1988

[54] ANTISTATIC RESIN COMPOSITION

[75] Inventors: Naoya Yamaguchi; Sigeyosi Koyabu; Tomoji Mizutani, all of Yatsushiro, Japan

[73] Assignee: Kohjin Co., Ltd., Tokyo, Japan

[21] Appl. No.: 844,040

[22] Filed: Mar. 25, 1986

[30] Foreign Application Priority Data

Jul. 10, 1985 [JP] Japan .................. 60-153179

[51] Int. Cl.$^4$ .......... C08K 5/20; C08K 3/28; C08L 23/00
[52] U.S. Cl. .......... 524/230; 524/232; 524/251; 524/253; 524/311; 524/314; 524/385; 524/429
[58] Field of Search .......... 524/428, 253, 251, 230, 524/232, 314, 311, 385, 429

[56] References Cited

U.S. PATENT DOCUMENTS 4,148,766  4/1979  McClain ................ 524/401
4,212,966  6/1980  McClain ................ 528/487

FOREIGN PATENT DOCUMENTS 5835867   3/1975  Japan .
60-44536  3/1985  Japan .

Primary Examiner—Joseph L. Schofer
Assistant Examiner—N. Sarofim
Attorney, Agent, or Firm—Armstrong, Nikaido, Marmelstein & Kubovcik

[57] ABSTRACT

An antistatic resin composition prepared by dissolving at least one of lithium nitrate and lithium chloride in cold or hot water, adding a molten surface active agent thereto, mixing them together to give a homogeneous mixture, and blending the same with a molten thermoplastic resin either before or after cooling and solidification. The composition is highly antistatic and gives a film having a high degree of transparency.

7 Claims, No Drawings

ANTISTATIC RESIN COMPOSITION

BACKGROUND OF THE INVENTION

The present invention relates to an antistatic resin composition. More particularly, it relates to an antistatic resin composition capable of giving antistatic films having a high degree of transparency.

Because of their excellent chemical and physical properties, thermoplastic resins such as polyolefin, polystyrene and polyvinyl chloride resins have been widely used in various shaped articles inclusive of films but since they possess high insulating properties as do many other plastics, they are ready to be statically charged on friction, for instance, so that the film surface is easily soiled with attracted dust and dirt. Furthermore, depending on the place of use, sparking due to discharge of accumulated static electricity may cause various troubles such as ignition of inflammable solvents and destruction of the internal circuits of integrated circuit elements. To avoid these and other troubles, many attempts have been made heretofore to impart antistaticity to the packaging films, bags, boxes and other products made of those resins.

Among the hitherto-known methods for imparting antistaticity to a thermoplastic resin are:
(1) The surface of a shaped article is coated with a variety of surface active agents.
(2) A variety of surface active agents are internally added.
(3) Electrically conductive fillers such as carbon black, carbon fiber, metal powder, metal fiber, etc. are internally added.
(4) A thin metallic film is formed on the surface of a shaped article.

However, the surface resistivity values of the antistatic plastic materials that can be manufactured by the surface or internal application of surfactants are generally more than $10^{10}$ ohms and such materials have been utilized only in applications not calling for a high degree of antistaticity.

Moreover, the shaped articles manufactured from an antistatic resin material prepared by the internal addition of an electrically conductive filler material are low in both surface resistivity and volume resistivity and although they are highly static-proof, even the film, for instance, is opaque and taking a bag as an example, the contents in the bag cannot be ascertained from the outside.

Of the antistatic materials carrying a thin metallic surface film, the transparent films on the market today are such that a noble metal is vapor-deposited on the surface. Though the vapor-deposited surface of such film is highly resistant to a build-up of static electricity, the most serious defect of this type of film is its high price and accordingly its use has been limited to special applications.

Thus, each of these known antistatic resin materials has its own advantages but also disadvantages. Under the circumstances, basically relying on the above-mentioned principle of internal addition of surfactants, the present inventors previously proposed a resin composition possessing improved antistaticity in Japanese Unexamined Patent Publication (Kokai Tokkyo Koho) No. 60-44536. This composition is an antistatic thermoplastic resin composition containing a defined type of organic matter and a metal salt such as lithium nitrate added to a thermoplastic resin and when the level of addition of the antistatic agent is approximately 0.5% by weight, a surface resistivity of about $10^7$ ohms could be accomplished. Moreover, the film had clarity and heat sealability as well.

However, the above antistatic thermoplastic resin composition prepared by adding a defined type of organic matter, namely a surfactant, and a metal salt as an antistatic agent to a thermoplastic resin is, indeed, satisfactory in antistatically and heat sealability, but since some of the metal salt used as a component of the antistatic agent is present in the form of relatively coarse grains in the stage of production, a part of them are trapped by the screen used for removal of foreign matter at the extruding machine so that the flow of the resin is hindered. As a consequence, the screen has to be replaced at short intervals and this detracts considerably from the efficiency of production. Furthermore, since a varying proportion of metal salt grains leak through the screen, it is difficult to ensure the uniformity of products. If the extrusion is carried out without use of such a screen, a large amount of metal salt grains enter into the resin and when a film is formed from such a resin composition, the metal salt grains are distributed on the film layer to seriously affect the film appearance. Moreover, since metal salt so added is not effectively utilized, the antistaticity of the film tends to be not as high as expected.

It is an object of the present invention to solve the above-mentioned problems associated with the presence of coarse metal salt particles in the antistatic thermoplastic resin composition and to obtain an thermoplastic resin composition having good antistaticity and appearance.

This and other objects of the invention will become apparent from the descriptions hereinafter.

SUMMARY OF THE INVENTION

The present invention relates to an antistatic resin composition prepared by dissolving at least one of lithium nitrate and lithium chloride in water in a ratio of 1 mole of the lithium salt to 1.8 to 5.2 moles of water inclusive of the water of crystallization of the lithium salt, heating the mixture if necessary, adding a surfactant in molten state thereto and mixing them together to give a homogeneous mixture and blending the same mixture into a thermoplastic resin in molten state to give an antistatic resin composition and, in another aspect, to a film formed from the above antistatic resin composition.

The lithium nitrate and/or lithium chloride used in accordance with the present invention may be either anhydrate or hydrate and need not be of any special grade. Of these two metal salts, lithium nitrate is preferred, because its hydrate has a melting point below the mixing temperature for thermoplastic resins and, therefore, tends to give a more homogeneous dispersion.

The surface active agents which can be employed in the present invention include the followings:
(1) Alkylamines and their derivatives
There are mentioned compounds having the following formulas:

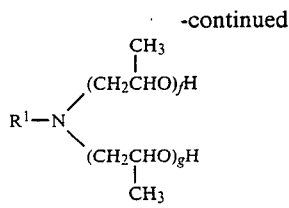 (II)

wherein $R^1$ is alkyl group having 8 to 22 carbon atoms, and f and g are the same or different and each is zero or an integer of 1 to 20, provided that the sum of f and g is 0 to 20, (2) Diamines and their derivatives There are mentioned compounds having the following formula:

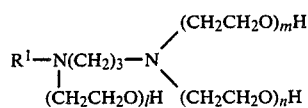 (III)

wherein $R^1$ is the same as defined above, l, m and n are the same or different and each is zero or an integer of 1 to 20, provided that the sum of l, m and n is 0 to 20.

(3) Polyamines

There are mentioned compounds having the following formula:

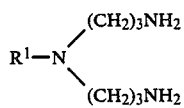 (IV)

wherein $R^1$ is the same as defined above.

(4) Alkylamines and their derivatives

There are mentioned compounds having the following formulas:

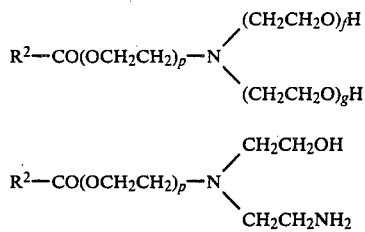 (V)(VI)

wherein $R^2$ is alkyl group having 7 to 21 carbon atoms, p is zero or 1, and f and g are the same as defined above.

(5) Polyol esters and their derivatives

There are mentioned compounds having the following formulas:

CH$_2$OOCR$^2$ (VII)
|
CHO(CH$_2$CH$_2$O)$_q$H
|
CH$_2$O(CH$_2$CH$_2$O)$_r$H

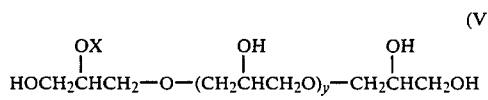 (VIII)

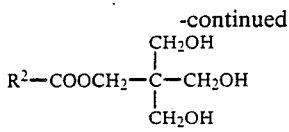 (IX)(X)

wherein $R^2$ is the same as defined above, X is $R^2$CO— or H, q and r are the same or different and each is zero or an integer of 1 to 21, provided that the sum of q and r is 0 to 21, and y is an integer of 2 to 20.

(6) Higher alcohols

There are mentioned compounds having the following formula:

$R^2$—OH (XI)

wherein $R^2$ is the same as defined above.

(7) Sulfonic acid type surfactants

There are mentioned compounds having the following formula:

$R^2$—Z—SO$_3$Na (XII)

wherein Z is

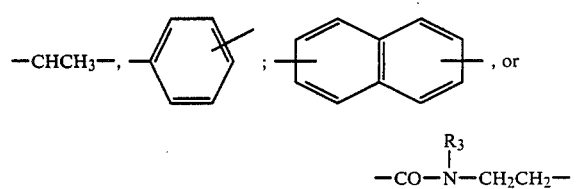

(wherein $R^3$ is H or —CH$_3$), and $R^2$ is the same as defined above.

It should be appreciated that the present invention is not limited to the use of the above-mentioned compounds.

As to the thermoplastic resin that can be employed for the purpose of the present invention, there is no particular limitation and olefin polymers, vinyl chloride polymers and so on can be utilized. However, from the standpoints of clarity, heat sealability, flexibility, low cost and other practical requirements, olefin polymers are particularly suitable. Examples of the olefin polymer include low density polyethylene, linear low density polyethylene, ethylene-vinyl acetate copolymer, ionomer, polypropylene and ethylene-propylene copolymer.

The method for producing the antistatic resin composition according to the present invention will be described hereinafter.

First, to 1 mole of the lithium salt, i.e. lithium nitrate and/or lithium chloride, water is added in a proportion of 1.8 to 5.2 moles, inclusive of the water of crystallization of the lithium salt, preferably 1.8 to 3.0 moles in the case of lithium nitrate or 1.8 to 2.0 moles in the case of lithium chloride. The lithium salt is throughly dissolved, if necessary under heating, then a predetermined amount of the surface active agent, preferably in molten state, is added and the mixture is stirred well at a temperature not less than the temperature at which the surfactant is melted to give a homogeneous mixture. This mixture is cooled to room temperature with continuous stirring so as to prevent phase separation. In heating and mixing an aqueous solution of the lithium salt with the surfactant, it is advisable to avoid excessive heating so that the water content of the system will not fall below 1.8 mole equivalents relative to 1 mole of the lithium salt present. This mixture may be directly, without cooling, blended with a molten thermoplastic resin.

The weight ratio of the lithium salt as anhydrous salt to the surfactant in the above mixture may range from 100:5 to 100:500 and is preferably in the range of 100:50 to 100:200. If the proportion of the surfactant is too small, the dispersion of the lithium salt in thermoplastic resin will be insufficient and, as a result, coarse crystalline particles tend to be formed. Conversely, if the proportion of the surfactant is excessive, the resultant shaped articles including film may not have sufficient antistaticity or will have a sticky surface.

While the level of addition of the above antistatic additive mixture to the thermoplastic resin varies with the intended use, it is about 1 to 20% by weight or preferably about 2 to 10% by weight in the case of a master batch for the preparation of antistatic shaped articles and about 0.05 to 2% by weight, preferably 0.2 to 1% by weight then antistatic shaped articles are directly produced without dilution. If the proportion of the antistatic additive in the final product exceeds 2% by weight per the amount of the resin, the product will present an undesirably sticky surface.

For the incorporation and mixing of a predetermined amount of the above homogeneous additive mixture with a molten thermoplastic resin, it is preferable to employ an open type mixing equipment such as a mixing roll. The use of a closed type machine such as a screw extruder is not desirable, because the water in the additive will then find its way as a vapor into the resin to cause foaming therein. The kneaded resin composition is taken out from the machine and molded to a suitable shape, for example, extruded and cut into pellets. Since depending on the degree of moisture absorption, air cells may be produced within the resin in the subsequent molding steps, the composition obtained in the above-described manner is preferably stored in a moisture-proof container. Depending on the level of addition of the antistatic additive and the intended use, the above resin composition can be used as a master batch for blending with other resins or may be directly molded into any shaped article.

In mixing the surfactant and lithium nitrate and/or lithium chloride to provide an antistatic agent, after the lithium salt is once dissolved in water, the lithium salt in the form of solution is mixed with the surfactant, and the resulting mixture is allowed to cool under mixing. Therefore, in the course of cooling, all or most of the available water is taken up as water of crystallization into the lithium salt. As a result it is unnecessary to dehydrate the system thoroughly and the formation of coarse particles of the lithium salt which is formed in the coarse of absolute drying is prevented. The above is a possible explanation for the absence of coarse particles of the lithium salt in the present invention.

In blending this antistatic additive into the thermoplastic resin, the melting point of the lithium salt, particularly that of lithium nitrate hydrate, is lower than the mixing temperature for the thermoplastic resin so that the former can be more uniformly dispersed in the resin. Furthermore, when an open-type kneading machine is employed, the water generated is removed from the system to prevent foaming and other troubles.

When the resin composition thus obtained is formed into a film, for instance, crystal grains of the lithium salt are not visible on the film layer so that the film presents an excellent appearance. Moreover, in the molding process, particles of the lithium salt do not clog the extruder screen used for removal of foreign matter and a satisfactory processability is assured.

The present invention is more specifically described and explained by means of the following Examples. It is to be understood that the present invention is not limited to the Examples, and various change and modifications may be made in the invention without departing from the spirit and scope thereof.

EXAMPLE 1

To 10 g of commercial lithium nitrate ($LiNO_3$, m.p. 261° C.) was added 5.2 g of water, followed by heating at 90° C. to dissolve the lithium nitrate in water. To the resulting solution was added 10 g of glycerin stearic acid monoester previously melted at 90° C. and the mixture was thoroughly stirred and mixed. The solution was allowed to cool with continuous stirring until it was solidified to provide about 25 g of an antistatic additive.

Separately, 50 g of polyethylene by high pressure method (available under the commercial name "UBE Polyethylene F-222 made by Ube Industries, Ltd.) was kneaded in a molten state on a 2-roller type mixing roll at 150° C. for 15 minutes, and after addition of 0.30 g of the above antistatic additive, further kneaded for 10 minutes to provide a thermoplastic resin composition.

About 2 g of the composition was weighed, sandwitched between a couple of stainless steel mirror plates and preheated in a heating press at 150° C. for 5 minutes. The sample was further pressed at a pressure of 10 $kg/cm^2$ for 1 minute to provide a film with a thickness of about 100 μm. The appearance, surface resistivity and light transmittance of the film were evaluated. The results are shown in Table 1. The surface resistivity was measured by means of a resistivity cell 16008A and a high-efficiency resistance meter 4329A, both manufactured by Hewrett-Packard Co. As to light transmittance, the total light transmittance was measured by the parallel light transmission method specified in JIS K-6714.

EXAMPLE 2

In a 500 ml mortar, 25 g of water was added to 50 g of lithium nitrate and the mixture was heated at about 90° C. to dissolve the metal salt. Then, 100 g of beef tallow alkylamino-ethylene oxide addition product (which contained as a main component compounds of the formula (I) wherein R is alkyl groups having 14 to 18 carbon atoms and the sum of f and g is about 6 to 20), previously melted at about 90° C., was added and the whole mixture was stirred with a pestle for 10 minutes. The heating was then terminated and the mixture was allowed to cool to room temperature with continuous stirring to provide about 170 g of a solid antistatic additive.

Separately, a two-roller type mixing roll was heated to about 150° C. and 1,850 g of the same high-pressure polyethylene as used in Example 1 was melted and kneaded. While the kneading was continued, the whole amount of the above-prepared additive was added in portions of about 10 g. After completion of addition of the whole amount, the mixture was further kneaded for about 20 minutes and, then, cast into a sheet with a thickness of about 3 mm. The sheet was cut into pellets sized about 3 mm×5 mm and these pellets were stored in a moisture-proof bag for use as an antistatic master batch.

Then, 1,000 g of the above master batch was blended well with 9,000 g of the same high-pressure polyethylene pellets as used in Example 1 and the blend was inflation-molded using a circular die having a diameter of 50 mm on an extruder having a diameter of 40 mm fitted with a 80 mesh screen to provide a tubular film with a thickness of 80 μm and a folded diameter of about 300 mm. There was no process trouble associated with clogging of the screen by crystal grains of lithium nitrate during the film-forming process and no clogging of the screen with such crystalline particles was observed on detaching the screen after film production.

The appearance, surface resistivity and light transmittance of the product film were evaluated. The results are summarized in Table 1.

EXAMPLES 3 AND 4

The same procedures as in Example 1 were repeated except that stearylamide-ethylene oxide addition product (the mole number of added ethylene oxide per 1 mole of stearylamide: about 8) or stearyl alcohol was used as a surfactant. The appearance, surface resistivity and light transmittance of the resulting film were evaluated. The results are summarized in Table 1.

EXAMPLE 5

The same procedures as in Example 1 were repeated except that the same beef tallow alkylamine-ethylene oxide addition product as used in Example 2 was used as a surfactant and a polyvinyl chloride resin (semi-rigid vinyl chloride resin with 5% by weight of di-n-octyl phthalate and 5% by weight of dibutyltin laurate) was used as a thermoplastic resin and the resulting antistatic additive was added to the polyvinyl chloride resin in an amount of 1% by weight. The resulting film was evaluated in regard to appearance, surface resistivity and light transmittance. The results are summarized in Table 1.

COMPARATIVE EXAMPLE 1

In a 500 ml mortar, 50 g of lithium nitrate was pulverized with a pestle under heating at about 90° C. for 30 minutes and, then, 50 g of glycerin stearic acid monoester previously melted by heating at about 90° C., was added. Then, under heating at about 90° C., the mixture was further stirred, with the pulverization of lithium nitrate with the pestle being continued, for 30 minutes. The heating was then stopped and the mixture was allowed to cool until it was solidified under continuous stirring to provide an antistatic additive.

Using the above additive, a film with a thickness of about 100 μm was manufactured in the same manner as Exmaple 1 and evaluated in regard to appearance, surface resistivity and light transmittance. The results are summarized in Table 1.

COMPARATIVE EXAMPLE 2

In a 500 ml mortar, 20 g of water was added to 50 g of lithium nitrate, followed by heating at about 90° C. to dissolve the metal salt. To this was added 50 g of the same beef tallow alkylamine-ethylene oxide addition product as used in Example 2 and which was previously melted at 90° C. and the mixture was further stirred with a pestle at about 90° C. for 10 minutes. Thereafter, to remove the water contained in the mixture, the mixture was stirred under heating with an electric hot-air dryer for about 1 hour. Then, the mixture was allowed to cool with stirring until it was solidified to provide about 100 g of an antistatic additive.

In the same manner as Example 2, the above additive was added to 1,900 g of the high pressure polyethylene to manufacture a pellet-shaped master batch.

In the same manner as in Example 2, this master batch was blended with 5,100 g of the same high pressure polyethylene as used in Example 1 and 3,000 g of linear low density polyethylene (available under the commercial name "Ultzex 2020L" made by Mitsui Petrochemical Industries, Ltd.) and the blend was inflation-molded. A sharp rise of resin pressure occurred after about 30 minutes, which necessitated detachment of the screen for removal of foreign matter. After removal of the screen, the inflation molding was resumed. The film sample taken before removal of the screen and the sample taken after the removal were evaluated in regard to appearance, surface resistivity and light transmittance. The results are summarized in Table 1. The results reveal that even if the lithium salt is once dissolved in water in preparing an antistatic additive, the lithium salt becomes coarse crystals when the additive is absolutely dried before blending with a thermoplastic resin, which results in impossibility of accomplishing the object of the present invention.

EXAMPLE 6

The same procedures as in Example 1 were repeated except that lithium chloride was used in lieu of lithium nitrate and the level of addition was changed as shown in Table 1 to provide a film with a thickness of about 100 μm. Though this additive was slightly more sticky than that of Example 1, there was no trouble in blending it into the resin. The appearance, surface resistivity and light transmittance of the resulting film were evaluated. The results are summarized in Table 1.

TABLE 1

| | Lithium salt | | Surface active agent | |
| --- | --- | --- | --- | --- |
| | Kind | Amount (%) (Note 1) | Name | Amount (%) (Note 1) |
| Ex. 1 | Nitrate | 0.25 | Glycerin monostearate | 0.25 |
| Ex. 2 | Nitrate | 0.25 | Beef tallow alkylamine-ethylene oxide addition product | 0.50 |
| Ex. 3 | Nitrate | 0.25 | Stearylamide-ethylene oxide addition product | 0.25 |
| Ex. 4 | Nitrate | 0.25 | Stearyl alcohol | 0.25 |
| Ex. 5 | Nitrate | 0.50 | The same as that used in Ex. 2 | 0.50 |
| Com. Ex. 1 | Nitrate | 0.25 | Glycerin monostearate | 0.25 |
| Com. Ex. 2 | Nitrate | 0.25 | The same as that used in Ex. 2 | 0.25 |

TABLE 1-continued

| | | | | |
|---|---|---|---|---|
| Ex. 6 | Chloride | 0.20 | Glycerin monostearate | 0.20 |

| | Appearance of film | Surface resistivity (Ohms) | Light transmittance (%) | Other remarks |
|---|---|---|---|---|
| Ex. 1 | No particles of lithium salt were observed on the film surface | $<1.0 \times 10^7$ | $>80$ | |
| Ex. 2 | No particles of lithium salt were observed on the film surface | $<1.0 \times 10^7$ | $>80$ | |
| Ex. 3 | No particles of lithium salt were observed on the film surface | $1.5 \times 10^9$ | $>80$ | |
| Ex. 4 | No particles of lithium salt were observed on the film surface | $4.3 \times 10^8$ | $>80$ | |
| Ex. 5 | No particles of lithium salt were observed on the film surface | $4.8 \times 10^7$ | $>80$ | |
| Com. Ex. 1 | Particles of about 30 μm in diameter were observed in an amount of 40 particles/100 cm² on the film surface. | $9.2 \times 10^9$ | $>80$ | |
| Com. Ex. 2 (Note 2) A | Particles of about 30 μm in diameter were observed in an amount of 10 particles/100 cm² on the film surface. | $4.5 \times 10^7$ | $>80$ | The operation was interrupted due to clogging of the screen. |
| Com. Ex. 2 (Note 2) B | Particles of about 30 μm in diameter were observed in an amount of 30 particles/100 cm² on the film surface | $2.1 \times 10^7$ | $>80$ | The operation was conducted without using the screen. |
| Ex. 6 | The same as in Ex. 1 | $<1.0 \times 10^7$ | $>80$ | |

Note 1: Percent by weight per 100% by weight of resin
Note 2: "A" means the measurements as to the film taken before removal of the screen. "B" means the measurements as to the film taken after removal of the screen.

It will be apparent from the above examples that despite the fact that the antistatic resin composition according to the present invention is of the type involving the internal addition of the antistatic agent, it is superior in clarity and antistaticity and features a uniform dispersion of the lithium salt so that, even when it is formed into a film, the film surface does not show visible evidence of particles of the antistatic agent.

In addition to the ingredients used in the Examples, other ingredients can be used in the Examples as set forth in the specification to obtain substantially the same results.

What we claim is:

1. An antistatic resin composition which comprises a thermoplastic resin and an antistatic composition comprising lithium nitrate and a surface active agent which is at least one member selected from the group consisting of alkylamines containing an alkyl group with 8 to 22 carbon atoms and derivatives thereof, alkyldiamines containing an alkyl group with 8 to 22 carbon atoms, alkylpolyamines containing an alkyl group with 8 to 22 carbon atoms, alkylamides containing an alkyl group with 8 to 22 carbon atoms, esters of polyols with higher fatty acids containing an alkyl group with 7 to 21 carbon atoms, and higher alcohols having 7 to 21 carbon atoms; said resin composition being prepared by preparing a solution of the lithium nitrate in water wherein the amount of water is from 1.8 to 5.2 moles, inclusive of the water of crystallization of the lithium nitrate, per 1 mole of the lithium nitrate, mixing the aqueous solution of the lithium nitrate with the surface active agent in a molten state, the amount of which is from 5 to 500 parts by weight based on 100 parts by weight of the lithium nitrate as an anhydrous salt, yielding an antistatic composition in the form of a homogeneous mixture, an kneading the antistatic composition with the thermoplastic resin in a molten state in a proportion of 0.05 to 20% by weight of the antistatic composition to the resin, thereby obtaining an antistatic resin composition which contains substantially no visible coarse particles of said lithium nitrate.

2. The antistatic resin composition of claim 1, wherein said thermoplastic resin is an olefin polymer.

3. The antistatic resin composition of claim 1, wherein the resin composition is in the form of a film formed either directly from the antistatic resin composition or after dilution of the antistatic resin composition with a further amount of said thermoplastic resin, said film containing 0.05 to 2.0% by weight of said antistatic composition to the resin.

4. A process for preparing an antistatic resin composition, which comprises preparing an aqueous solution of lithium nitrate wherein the amount of water is from 1.8 to 5.2 moles, inclusive of the water of crystallization of the lithium nitrate, per 1 mole of the lithium nitrate; mixing the aqueous solution of lithium nitrate with a surface active agent in a molten state, the amount of which is from 5 to 500 parts by weight based on 100 parts by weight of the lithium nitrate as an anhydrous salt, yielding an antistatic composition in the form of a homogeneous mixture; and kneading the antistatic composition with a thermoplastic resin in a molten state in a proportion of 0.05 to 20% by weight of the antistatic composition to the resin, thereby obtaining an antistatic resin composition which contains substantially no visible coarse particles of said lithium nitrate.

5. The process of claim 4, wherein said surface active agent is at least one member selected from the group consisting of alkylamines containing an alkyl group with 8 to 22 carbon atoms and derivatives thereof, alkyldiamines containing an alkyl group with 8 to 22 carbon atoms, alkylpolyamines containing an alkyl group with 8 to 22 carbon atoms, alkylamides containing an alkyl group with 8 to 22 carbon atoms, esters of polyols with higher fatty acids containing an alkyl group with 7 to 21 carbon atoms, and higher alcohols having 7 to 21 carbon atoms.

6. The process of claim 4, wherein said thermoplastic resin is an olefin polymer.

7. The process of claim 4, wherein the resin composition is in the form of a film formed either directly from the antistatic resin composition or after dilution of the antistatic resin composition with a further amount of said thermoplastic resin, said film containing 0.05 to 2.0% by weight of said antistatic composition to the resin.

* * * * *